(12) United States Patent
Kellar

(10) Patent No.: US 10,393,867 B2
(45) Date of Patent: Aug. 27, 2019

(54) PHOTONIC HYBRID RECEIVE ANTENNA

(71) Applicant: The United States of America as represented by the Secretary of the Navy, Crane, IN (US)

(72) Inventor: Kevin Kellar, Bloomfield, IN (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 660 days.

(21) Appl. No.: 15/140,892

(22) Filed: Apr. 28, 2016

(65) Prior Publication Data

US 2016/0320475 A1    Nov. 3, 2016

Related U.S. Application Data

(60) Provisional application No. 62/156,092, filed on May 1, 2015.

(51) Int. Cl.
| | |
|---|---|
| *G01S 13/42* | (2006.01) |
| *G01S 7/03* | (2006.01) |
| *G01S 13/86* | (2006.01) |
| *G01S 17/42* | (2006.01) |
| *H01Q 3/26* | (2006.01) |
| *G02B 6/02* | (2006.01) |
| *G02B 6/293* | (2006.01) |
| *G01S 7/41* | (2006.01) |
| *G01S 13/02* | (2006.01) |

(52) U.S. Cl.
CPC ............... *G01S 13/42* (2013.01); *G01S 7/03* (2013.01); *G01S 7/032* (2013.01); *G01S 13/865* (2013.01); *G01S 17/42* (2013.01); *H01Q 3/2676* (2013.01); *G01S 7/41* (2013.01); *G01S 2013/0254* (2013.01); *G02B 6/02076* (2013.01); *G02B 6/2938* (2013.01)

(58) Field of Classification Search
CPC ........................................................ G01S 13/42
USPC ............................................................ 342/54
See application file for complete search history.

(56) References Cited

U.S. PATENT DOCUMENTS

| | | |
|---|---|---|
| 2003/0128417 A1 | 7/2003 | Kawanishi |
| 2008/0111735 A1* | 5/2008 | Ridgway ............ G01S 7/03 342/200 |

* cited by examiner

*Primary Examiner* — Peter M Bythrow
*Assistant Examiner* — Helena H Seraydaryan
(74) *Attorney, Agent, or Firm* — Christopher A. Monsey

(57) ABSTRACT

Methods and systems for determining true time delay from each receiving element of an 'active electronically scanned array' (AESA) or a phased array antenna. Embodiments of the invention can include electromagnetic EM elements, optical waveguides, and wavelength selective FGBs are collectively configured as a plurality of dual purpose elements that couples an EM field and uses an induced voltage to change an index of refraction of the optical waveguide's electro-optic (EO) material, where the EO material will also function as a dielectric in an antenna element, where the signals comprising optical signals propagate through EM element acting as phase delay elements, where the measuring system compares the reflected signals with a reference signal with no phase delay to determine said signals phase delay.

19 Claims, 10 Drawing Sheets

PHOTONIC HYBRID RECEIVE ANTENNA

CROSS-REFERENCE TO RELATED APPLICATIONS

The present application claims priority to U.S. Provisional Patent Application Ser. No. 62/156,092, filed May 1, 2015, entitled "PHOTONIC HYBRID RECEIVE ANTENNA", the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,232) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention generally relates to methods and systems for more accurately determining radar cross section (RCS) or location of an object reflecting radio frequency (RF) waves using true time delay of an optical signal. More specifically, time delay may be induced by, for example, interaction of the optical signal with receiving elements of an active electronically scanned array (AESA), such as patch antennas, bow tie antennas, or another antenna that uses a substrate acting as dialectic between a metal plate and a ground plane, see, e.g., FIG. 7.

Two approaches associated with scanning radar antennas include mechanical scanning and electronic scanning. Mechanical scanning requires that a whole antenna be mechanically positioned in azimuth and elevation in order to sweep a desired coverage area. Electronic scanning uses phase or frequency input to shift the beam in angle. Advantages of electronic scanning include multiple agile beams, which allows simultaneous tracking, searching, and communicating functions; no moving mechanical parts to fail for greater reliability; less space requirements; increased ease of upgrading the transmit/receive (T/R) modules; short pulses for low probability of interception; and ability to deal with high congestion spectrum environments (e.g., highways with large numbers of self-driving vehicles with radar systems that could jam each other).

Disadvantages of electronic scanning include beam squint; cooling requirements for the T/R modules; narrow field of view; and the cost is greater than a rotating antenna. Existing AESAs control amplitude and phase of each antenna element or group of antenna elements. Conditioning or manipulation of beam direction and shape allows for greater steer ability over conventional mechanically steered antennas. However, because of wide, instantaneous bandwidths of waveforms and narrow beam width, beam squint can be generated, and the resulting beam squint may be enough to steer off target. Many years of effort and millions of dollars have been expended in research and development to mitigate beam squint in phased array antennas. Thus, among other things, a need exists to mitigate beam squint and associated issues with front-end AESA components.

A developmental effort associated with various embodiments of the invention addresses several design or developmental challenges. A first challenge was to develop a receive antenna architecture that uses optical phase delay as the primary means of gathering information rather than traditional means of electrical signals. A second challenge was to develop a model and research materials for a receive element that will transform electrical signals into an optical phase delay.

An embodiment of the invention can include a phase delay element design that couples an electromagnetic field with an electromagnetic (EM) signal and uses an induced voltage to change an index of refraction for an electro-optic (EO) material that then induces a phase delay in the EM signal. The EO material can also function as a dielectric for the phase delay element. An optical signal can propagate through an exemplary phase delay element and be compared with a reference signal with no phase delay. The delayed EM signal may then be compared to the EM reference beam that does not undergo delay to determine the true time delay.

One new feature of one embodiment includes providing an ability to quickly transform an electrical signal into an optical signal. This conversion provides many advantages such as enabling true time delay between receive elements, thus mitigating the effects of beam squint; less electromagnetic interference (EMI); fewer microwave components in the receiving signal path; an ability to process signal remotely; less stringent power requirements at the antenna; and an ability to multiplex many signals onto one optical waveguide.

According to a further illustrative embodiment of the present disclosure, methods of manufacturing and use are also provided. Further illustrative embodiments can also include using optical phase delay produced from an alternative embodiment, which could be used to replace photodetectors. Another application can include remotely measuring EM fields. An example can include using an optical fiber placed along a parameter and integrating the antennas into the fiber, providing an ability to discern a location along the fiber line that an EM signal originates.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
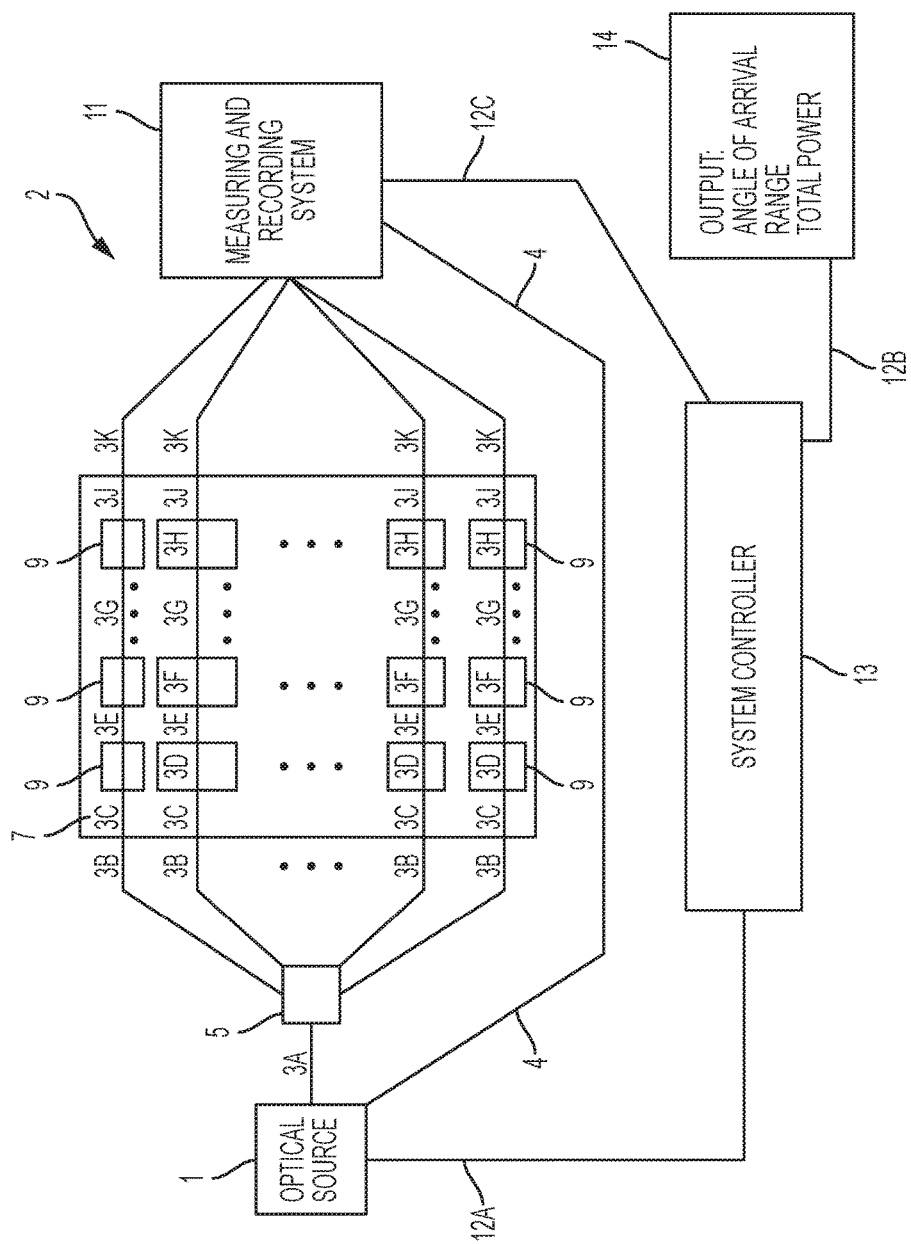
FIG. 1 shows a block diagram of an exemplary embodiment of a photonic hybrid receive antenna.

FIG. 1 shows an exemplary embodiment of a photonic hybrid receive antenna 2. An optical source 1 is configured to transmit a desired wavelength of EM radiation, forming an EM signal, such as an optical pulse, along a first optical waveguide segment 3A and an optical waveguide containing the reference EM signal 4. A system controller 13 may communicate with the optical source 1 to modulate the EM signal from the optical source 1. The system controller 13 may be in communication with the optical source 1 via a control line segment 12A. A general telecommunication's standard wavelength of 1550 nm may be used as the EM signal, although alternative wavelengths may be used as well. The first optical waveguide segment 3A extends from the optical source 1 to a splitter 5. The splitter 5 is configured to split the EM signal to travel along a plurality of second optical waveguide segments 3B. The plurality of second optical waveguide segments 3B may then extend to an antenna support structure 7. The antenna support structure 7 may be comprised of a plurality of EM elements 9 situated in rows and columns. A plurality of third optical waveguide segments 3C may then extend from the plurality of second optical waveguide segments 3B to a first column of the EM elements 9. A plurality of fourth optical waveguide segments 3D may extend through the first column of the EM elements 9, such that each optical waveguide within the plurality of fourth optical waveguide segments 3D passes through one of the EM elements 9 within the first column of the EM elements 9. A plurality of fifth optical waveguide segments 3E may then extend from the first column of the EM elements 9 to a second column of the EM elements 9. A plurality of sixth optical waveguide segments 3F may extend through the second column of the EM elements 9, such that each optical waveguide within the plurality of sixth optical waveguide segments 3F passes through one of the EM elements 9 within the second column of the EM elements 9. This pattern may continue as many times as there are columns of the EM elements 9. A plurality of seventh optical waveguide segments 3G may then extend from the second column of the EM elements 9 to a last column of the EM elements 9. A plurality of eighth optical waveguide segments 3H may extend through the last column of the EM elements 9, such that each optical waveguide within the plurality of eighth optical waveguide segments 3H passes through one of the EM elements 9 within the last column of EM elements 9. A plurality of ninth optical waveguide segments 3J may then extend from the last column of the EM elements 9 beyond the antenna support structure 7. A plurality of tenth optical waveguide segments 3K may extend from the plurality of ninth optical waveguide segments 3J to a measuring and recording system 11. The measuring and recording system 11 may be configured to compare phase difference between EM signals traveling through different EM elements 9 and the EM signal traveling through the optical waveguide containing the reference EM signal 4. In some embodiments, the measuring and recording system 11 may determine the various phase shift between multiple wavelengths of EM signals, see, e.g., FIG. 3. Referring back to FIG. 1, a system controller 13 may be in communication with the measuring and recording system 11 via a control line segment 12C. The measuring and recording system 11 selected will be based on the desired use of the photonic hybrid receive antenna 2. For example, an electronic timer may be used to determine the phase delay in the EM signal caused by RF waves reflected from unmanned aerial vehicles (UAVs), automobiles, or other similarly sized air, land, and sea units. Alternatively, for more precise phase calculations and comparisons, often needed for high performance direction finding and high performance radar systems, an optical interferometer may be used. The system controller 13 may be configured to determine a range of an object reflecting RF waves, the angle of arrival of an RF wave 33 (see e.g. FIG. 8) striking the antenna support structure 7, and the total power of the RF wave 33. Having determined the range, the angle of arrival, and the power of the RF wave 33, a Radar Cross-Section (RCS) or location of the object reflecting may be calculated by the system controller 13 from the range, the angle of arrival and the power. The system controller 13 may be in communication with an output system 14 configured to communicate the angle of arrival, the range, and the total power to an operator. The system controller 13 may be in communication with the output system 14 via a control line segment 12B. Additionally, the output system 14 may be a radar display configured that communicates the RCS or location of the object reflecting the RF waves.

Figure 2A:
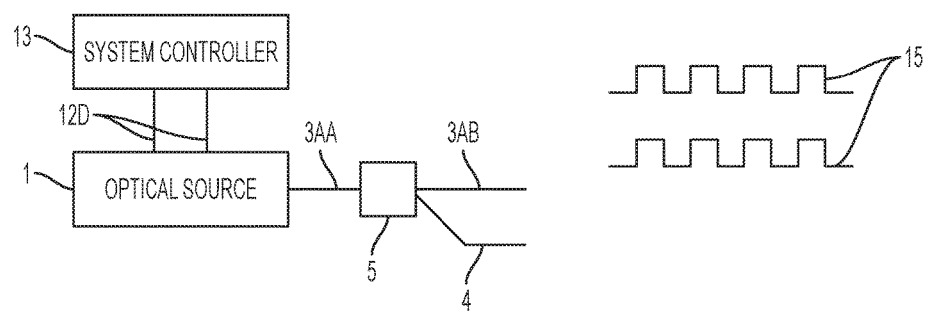
FIG. 2A shows a block diagram of an exemplary embodiment of an optical source in parallel architecture.

FIG. 2A shows an exemplary embodiment of an optical source configuration in parallel architecture. The optical source 1 may be, for example, a laser, a light emitting diode (LED), or another coherent light source; the laser being the preferred optical source 1. In this embodiment, the optical source 1 is in communication with the system controller 13 via a control line segment 12D. The system controller 13 may be configured to direct output of the optical source 1, for example, such as a wave pulse 15. In this embodiment, the optical source 1 emits the desired wavelength of EM radiation to form the EM signal along an optical waveguide segment 3AA into a splitter 5. The splitter 5 is configured to split the EM signal, such that it can travel long a plurality of optical waveguide segments, e.g., 3AB and 4. Some of the optical waveguides 3AB will extend to the antenna support structure 7, shown in FIG. 1, while at least one may be an optical waveguide containing a reference EM signal 4 in those embodiments in which the reference EM signal is necessary.

Figure 2B:
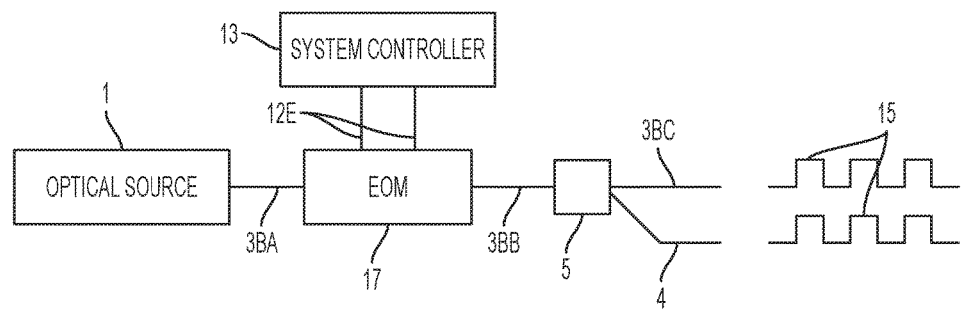
FIG. 2B shows a block diagram of an exemplary embodiment of an optical source in parallel architecture.

FIG. 2B shows another exemplary embodiment of another optical source configuration in parallel architecture. In this embodiment, the optical source 1 emits a desired wavelength of EM radiation to form an EM signal through an optical waveguide segment 3BA that extends from the optical source 1 to an electro-optic modulator (EOM) 17. The EOM 17, for example, a mach zehneder modulator, may be in communication with the system controller 13 via a control line segment 12E. The system controller 13 in conjunction with the EOM 17 controls modulation, such as pulse, width, and repetition period of the desired wavelength from the optical source 1. In this embodiment, a splitter 5 may be placed along the optical waveguide 3 after the EOM 17. The splitter 5 may split the EM signal such that the EM signal travels along some of the optical waveguides 3BC to the antenna element, such as in FIG. 1, while at least one may be the optical waveguide containing the reference EM signal 4 in those embodiments in which a reference EM signal is necessary.

Figure 2C:
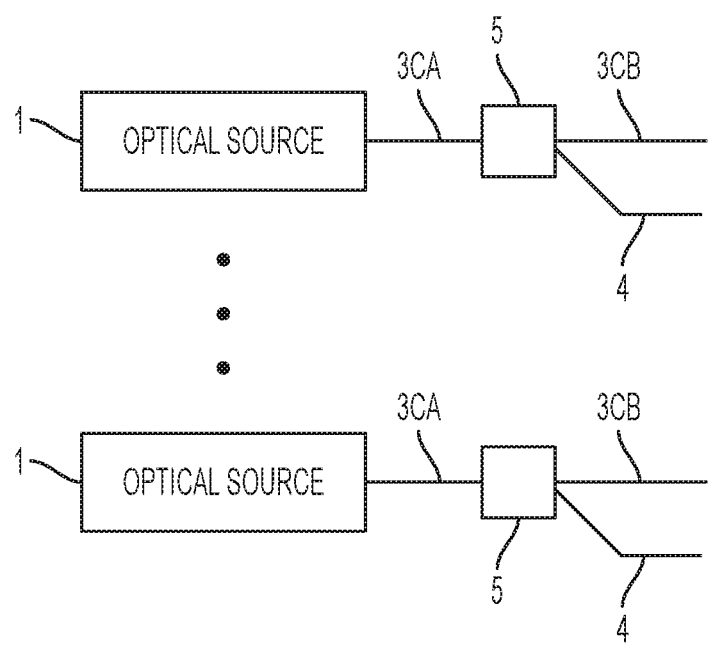
FIG. 2C shows a block diagram of an exemplary embodiment of an optical source in serial architecture.

FIG. 2C shows another exemplary embodiment of an optical source configuration in serial architecture. In this embodiment, a plurality of optical sources 1 and 1' may be used. The plurality of optical sources 1 and 1' may be configured to emit desired wavelengths of EM radiation. Because the plurality of optical sources 1 and 1' is used, more than one wavelength of EM radiation may form the EM signal and travel through a plurality of optical waveguide segment 3CA and 3CA'. Additionally, the embodiment may have one or more splitters 5, which may split the EM signal so that it travels along a plurality of optical waveguides 3CA, 3CA', 4, and 4'. The splitter 5 may split the EM signal such that the EM signal travels along some of the plurality of optical waveguides 3CA and 3CA' to the antenna support structure 7, such as in FIG. 1, while at least one may be the optical waveguide containing the reference EM signal 4 and 4' in those embodiments in which the reference EM signal is necessary. The plurality of optical sources 1 and 1' may directly modulate the output (such as in FIG. 2A) or the output EM radiation may be modulated externally by the EOM 17 (such as in FIG. 2B).

Figure 3:
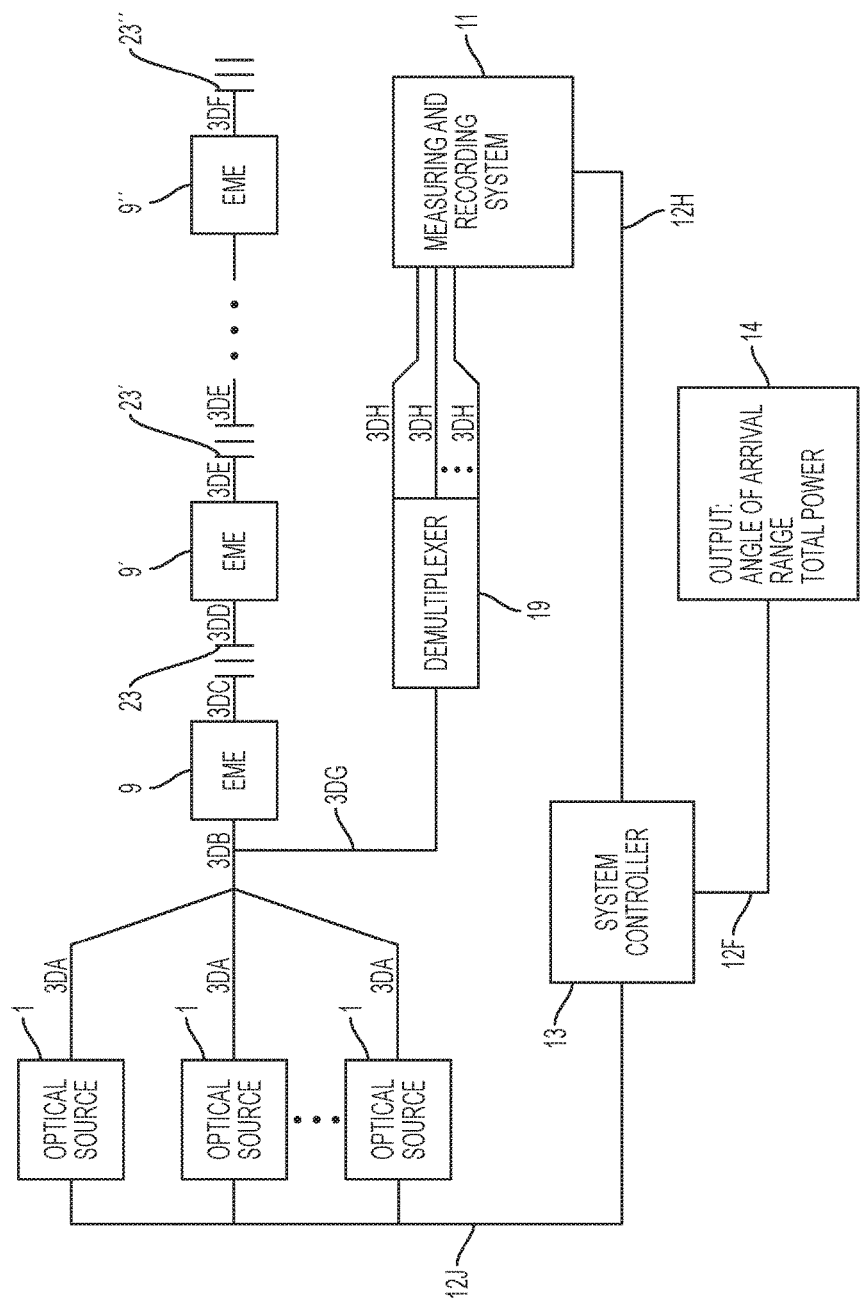
FIG. 3 shows a block diagram of an exemplary embodiment of a photonic hybrid receive antenna.

FIG. 3 shows block diagram of an exemplary embodiment of the photonic hybrid receive antenna 2 with a plurality of optical sources 1, 1' and 1" configured in a serial architecture. A system controller 14 may be in communication with the plurality of optical sources 1, 1' and 1" via a control line segment 12J. In this embodiment, a plurality of desired wavelengths of EM radiation is emitted from the plurality of optical sources 1, 1', and 1", with each optical source in the plurality of optical sources 1, 1', and 1" emitting a different desired wavelength to form the EM signal. The EM signal from the plurality of optical sources 1, 1' and 1" travels through a plurality of first optical waveguide segments 3DA, 3DA', 3DA" respectively, which converge into a second optical waveguide segment 3DB. The second optical waveguide segment 3DB extends to a first EM element 9, wherein the second optical waveguide segment 3DB passes through the first EM element 9. A third optical waveguide segment 3DC extends from the first EM element 9 to a first Fiber Bragg Grating (FBG) 23, which is selected to reflect a wavelength from a first optical source 1. A fourth optical waveguide segment 3DD extends from the first FBG 23 to a second EM element 9', wherein the fourth optical waveguide segment 3DD passes through the second EM element 9'. A fifth optical waveguide segment 3DE extends from the second EM element 9' to a second FBG 23', which is selected to reflect a wavelength from a second optical source 1'. This sequence may be repeated as many times over as there are optical sources. A sixth optical waveguide segment 3DE extends from the second FBG 23' to a last EM element 9", wherein the sixth optical waveguide segment 3DE passes through the last EM element 9". A last optical waveguide segment 3DF extends from the last EM element 9" to a last FBG 23", which is selected to reflect a wavelength from a last optical source 1". Additionally, an eighth optical waveguide segment 3DG is in communication with the second optical waveguide segment 3DB such that it can receive a reflected EM signal. The eighth optical waveguide segment 3DG is also in communication with a demultiplexer 19, the demultiplexer 19 may be configured to separate the reflected EM signal into respective optical waveguides in a plurality of ninth optical waveguide segments 3DH, 3DH', and 3DH", such that different reflected wavelengths respectively travel through the plurality of ninth optical waveguide segments 3DH, 3DH', and 3DH" before terminating at the measuring and recording system 11. The measuring and recording system 11 may be in communication with the system controller 13 via a control line segment 12H. The system controller 13 may be configured to determine the range of the object reflecting the RF wave 33 (see e.g., FIG. 8), the angle of arrival of the RF wave 33 striking the antenna support structure 7, and the total power of the RF wave 33. Having determined the range, the angle of arrival, and the power of the RF wave 33, the RCS or location of the object reflecting RF waves may be calculated by the system controller 13. The system controller 13 may be in communication with an output system 14 configured to communicate the angle of arrival, the range, and the total power to the operator. The system controller 13 may be in communication with the output system 14 via a control line segment 12F. Additionally, the output system 14 may be the radar display that communicates the RCS or location of the object reflecting the RF waves 33.

Figure 4:
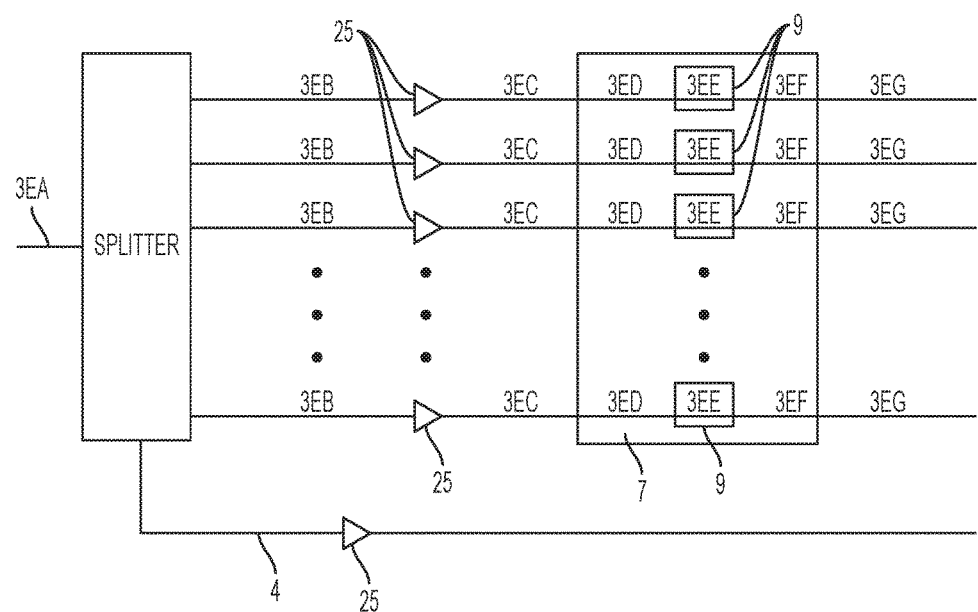
FIG. 4 shows a block diagram of an exemplary embodiment of an optical splitter in conjunction with an antenna support structure and amplifiers.

FIG. 4 shows an exemplary embodiment of a first optical waveguide segment 3EA being split by a splitter 5 into a plurality of second optical waveguide segments 3EB and an optical waveguide containing a reference EM signal 4, each optical waveguide in the plurality of second optical waveguide segments 3EB and the optical waveguide containing the reference EM signal 4 is in communication with an amplifier 25. Each of the amplifiers 25 that is in communication with one of the plurality of second optical waveguide segments 3EB is also in communication with a plurality of third optical waveguide segments 3EC that extend to an antenna support structure 7. A plurality of fourth optical waveguide segments 3ED extends along the antenna support structure 7 to a plurality of EM elements 9. A plurality of fifth optical waveguide segments 3EE is disposed within the plurality of EM elements 9 respectively and is in communication with the plurality of fourth optical waveguide segments 3ED and a plurality of sixth optical waveguide segments, 3EF which extend along the antenna support structure 7. A plurality of seventh optical waveguide segments 3EG is in communication with the plurality of sixth optical waveguide segments 3EF, respectively, and extend beyond the antenna support structure 7.

Figure 5:
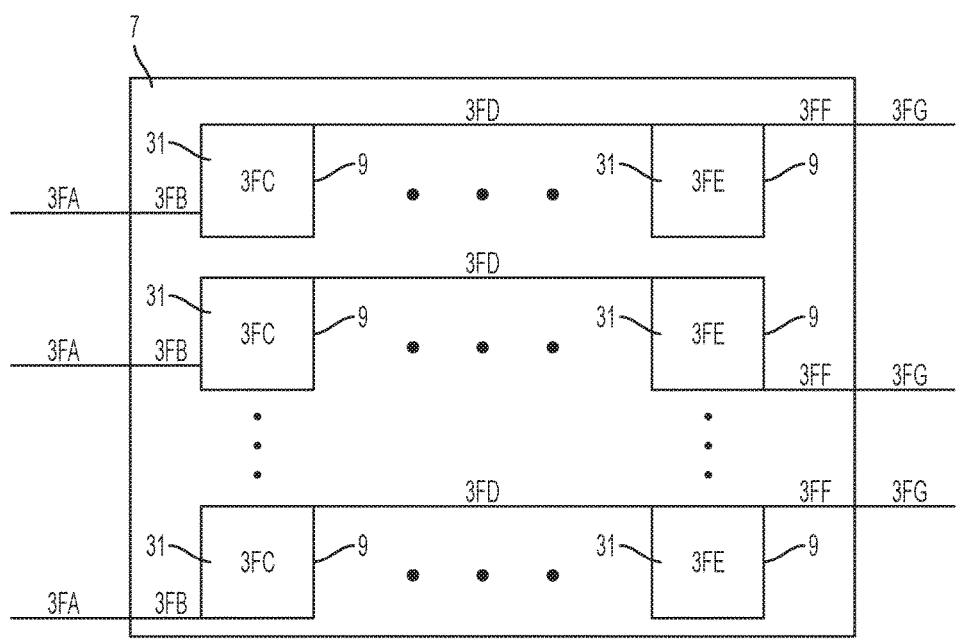
FIG. 5 shows a top-down, cross-sectional view of an exemplary antenna support structure.

FIG. 5 shows a top-down view of an exemplary antenna support structure 7, having a plurality of EM elements 9 in rows and columns. A plurality of first optical waveguide segments 3FA is in communication with a plurality of second optical waveguide segments 3FB that run along the antenna support structure. The plurality of second optical waveguide segments 3FB extends to the plurality of EM elements 9. A plurality of third optical waveguide segments 3FC may pass through the substrate 31 of the EM element 9 in a serpentine pattern with each waveguide in the plurality of third waveguide segments 3FC disposed within one EM element within the plurality of EM elements 9. A plurality of fourth waveguide segments 3FD extends from the plurality of third waveguide segments 3FC to a plurality of fifth waveguide segments 3FE. The plurality of fifth waveguide segments 3FE may pass through the substrate 31 of the EM elements 9 with each waveguide in the plurality of fifth waveguide segments 3FE disposed within one EM element within the plurality of EM elements 9. A plurality of sixth optical waveguide segments 3FF may run along the antenna support structure 7 and be in communication with the plurality of fifth optical waveguide segments 3FE and a plurality of seventh optical waveguide segments 3FG, which extends beyond the antenna support structure 7.

Figure 6:
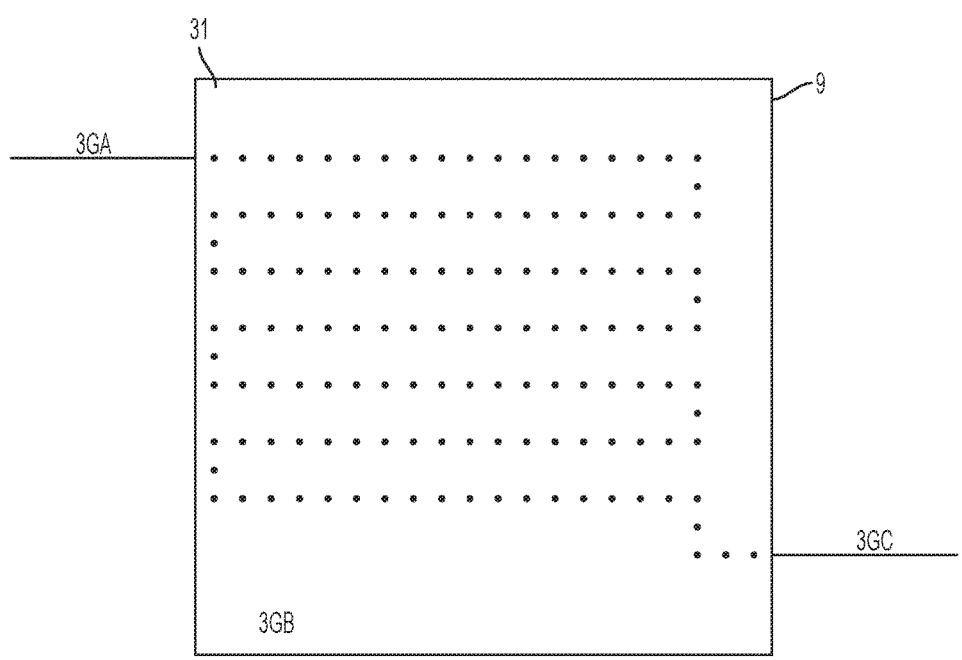
FIG. 6 shows a top-down, cross-sectional view of an exemplary EM element with a metal plate removed.

FIG. 6 shows an exemplary top-down, cross-sectional view of the EM element 9 with the metal plate removed. A first optical waveguide segment 3GA is in communication with a second optical waveguide segment 3GB. The second optical waveguide segment is disposed within the substrate 31 of EM element 9 and, for example, runs in a serpentine pattern throughout. A third optical waveguide segment 3GC is in communication with the second optical waveguide segment 3GB. This embodiment is beneficial because the greater the distance that the EM signal must travel along the second optical waveguide segment 3GB, the greater the effect of phase shift on the EM signal will be, which allows detection of weaker RF waves.

Figure 7:
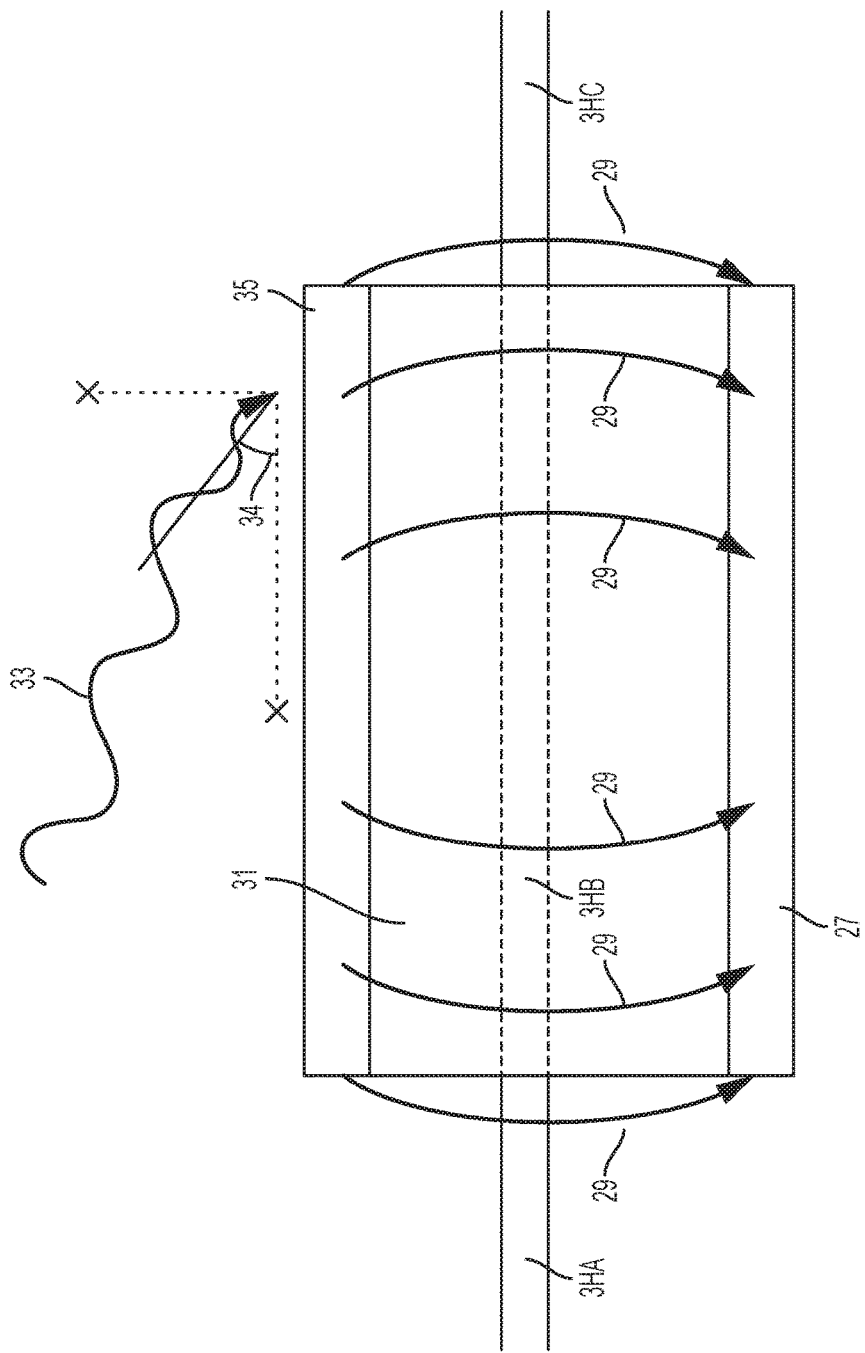
FIG. 7 shows a cross-sectional side view of the FIG. 6 exemplary EM element in conjunction with an optical waveguide.

FIG. 7 shows an exemplary cross-sectional view from the side of the EM element 9. The EM element 9 is comprised of a metal plate 35 secured to a topside of the substrate 31. The metal plate 35 may be comprised of copper or another element or alloy that can collect the energy of the RF wave 33. A ground plane 27 affixed to a bottom side of the substrate 31 creates an electric field across the substrate 31 when the RF wave 33 strikes the metal plate 35, represented as an electric field line 29. The substrate 31 functions as a dielectric. A first optical waveguide segment 3HA is in communication with a second optical waveguide segment 3HB that is disposed through the substrate 31. The second optical waveguide segment's 3HB index of refraction should be greater than the substrate's 31 index of refraction, such that total internal reflection may be achieved. Additionally, the second optical waveguide segment 3HB may be comprised of an EOM having a dielectric constant that is similar to the dielectric constant of the substrate 31 material. A third optical waveguide segment 3HC is in communication with the second optical waveguide segment 3HB. For example, the RF wave 33 strikes the metal plate 35 at an angle 34. The EM signal, such as an optical pulse, travels through the substrate 31 along the optical waveguide 3. The RF energy 33 induces an electric field across the substrate 31. The electric field causes a delay in phase of the EM signal passing through the EM element 9 by changing the index of refraction of the EO material.

Figure 8:
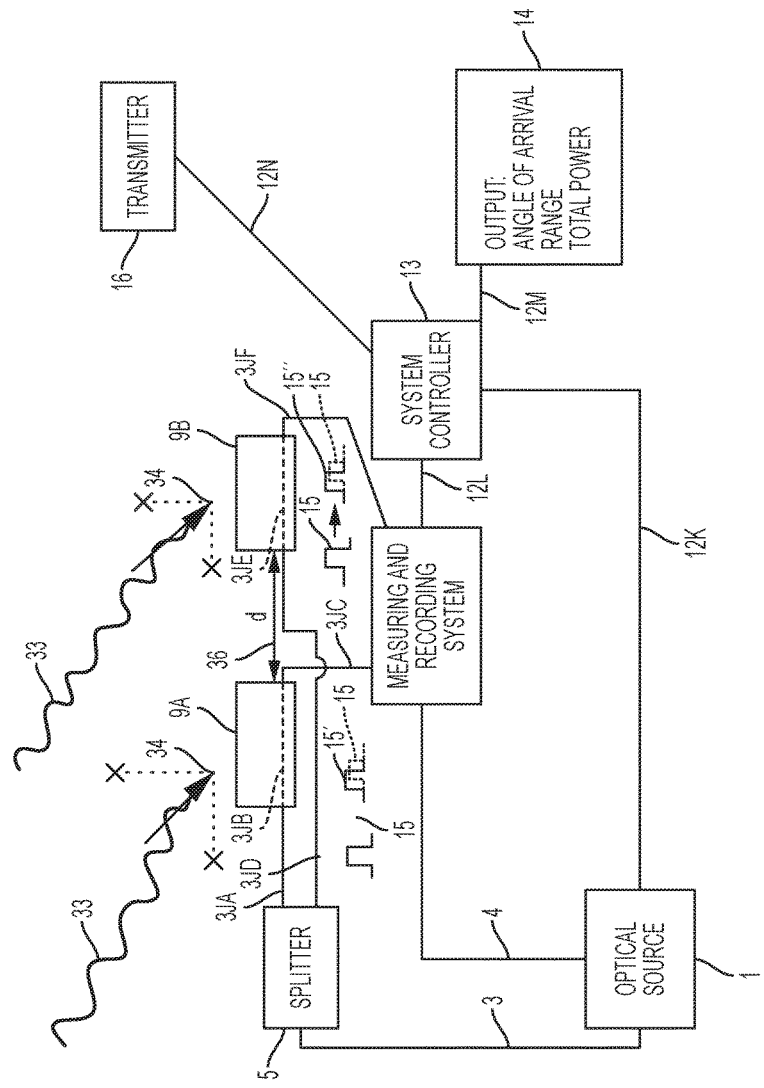
FIG. 8 shows an exemplary embodiment of a plurality of EM elements interacting with a radio RF wave.

FIG. 8 shows an exemplary interaction between the RF wave 33 and multiple EM elements 9A and 9B. For example, to calculate the angle of arrival of the RF wave 33. A system controller 13 may be in communication with an optical source 1 via a control line segment 12K. The optical source 1 emits an EM signal, which may be for example, an optical pulse 15. The EM signal travels through an optical waveguide 3 to a splitter 5. Additionally, the EM signal emitted from the optical source 1 may travel through an optical waveguide containing a reference EM signal 4 to the measuring and recording system 11. The splitter 5 being configured to split the EM signal to travel through a plurality of optical waveguide segments 3JA and 3JD. For example, a first optical waveguide segment 3JA is in communication with a second optical waveguide segment 3JB, which is disposed through the substrate of a first EM element 9A and is in communication with a third optical waveguide segment 3JC. The third optical waveguide segment 3JC is in communication with a measuring and recording system 11. The fourth optical waveguide segment 3JD is in communication with a fifth optical waveguide segment 3JE, which is disposed through the substrate of a second EM element 9B and is in communication with a sixth optical waveguide segment 3JF. The sixth optical waveguide segment 3JF is in communication with the measuring and recording system 11.

The first EM element 9A and the second EM element 9B are separated by a distance (d) 36. The measuring and recording system may measure the differences in phases between the EM signal that traveled through the first EM element 9A, the EM signal that traveled through the second EM element 9B, and the reference EM signal 4. The measuring and recording system 11 may be in communication with the system controller 13 via a control line segment 12L. The system controller 13 may be in communication with a transmitter 16 via a control line segment 12N. The transmitter 16 being configured to emit RF waves, such as, 33. The system controller 13 may also be in communication with the output system 14 via a control line segment 12M. Additionally, the output system 14 may be configured to communicate the angle or arrival, the range, or the total power, or also, may communicate the RCS or location of the object reflecting the RF waves, such as, 33. For example, the output system 14 may be a radar display.

The photonic hybrid receive antenna, such as the one shown in FIG. 8, may operate, for example, when the RF wave 33 strikes the first EM element 9A and the second EM element 9B at different times because of the angle 34 at which the RF wave 33 comes in, unless the RF wave 33 impacts the EM elements at 90° angle. As the RF wave 33 strikes the first EM element 9A, it induces a first phase delay 15' of the optical pulse 15. As the RF wave 33 strikes the second EM element 9B, it induces a second phase delay 15" of the optical pulse 15. The measuring and recording system 11, measures the difference between the first phase delay 15' and the second phase delay 15". Because of the time difference between the RF wave 33 striking the first EM element 9A and the second EM element 9B, a phase difference will exist between the first phase delay 15' and the second phase delay 15". From the phase difference and the distance 36, the angle 34 in which the RF wave 33 strikes the EM elements 9A and 9B may be determined.

Still referring to FIG. 8, the angle of arrival, the range, and the total power may be calculated by the system controller 13. The system controller 13 may calculate the range in a manner similar to other radar systems. For example, the RF wave, such as, 33 may be transmitted by the transmitter 16. The RF wave, such as, 33 may propagate through atmosphere before coming into contact with and being reflected by the object reflecting the RF waves, such as, 33. By knowing a time difference between when the RF wave 33 was transmitted and when the RF wave 33 was received, the range of the object reflecting the RF wave 33 can be determined.

The total power may be calculated from voltage, V, using the following equation:

$$\Delta_{\varphi EO} = \frac{\pi}{\lambda_0} n_2^3 r_{41} \frac{VL}{t_g}$$

For example, $\Delta\phi_{EO}$ may be determined from the difference between the first phase delay 15' and the reference EM signal 4. Alternatively, it may be determined from the difference between an average phase delay across all EM elements, e.g. 9A and 9B in FIG. 8, and the reference EM signal 4. Additionally, $\lambda_0$ is a known wavelength emitted from the optical source 11; $n_2$ is a known electro-optic coefficient of the optical waveguides 3JB and 3JE; $r_{41}$ is a known electro-optic coefficient of the substrate 31 (shown best in FIG. 7); $t_g$ is a known thickness of the optical waveguide 3; and L is a known length of the optical waveguides 3JB and 3JE within the substrate 31 (shown best in FIG. 7).

The angle of arrival 34 may be calculated using the following equation and solving for θ:

$$\Delta_{\varphi EO} = \frac{2\pi d \sin\theta}{\lambda_0}$$

For example, in FIG. 8, after determining θ, the angle of arrival 34 may be determined by 90°−θ.

Finally, the RCS of the object reflecting RF waves 33 may be determined from the angle of arrival, the range, and the total power.

Figure 9:
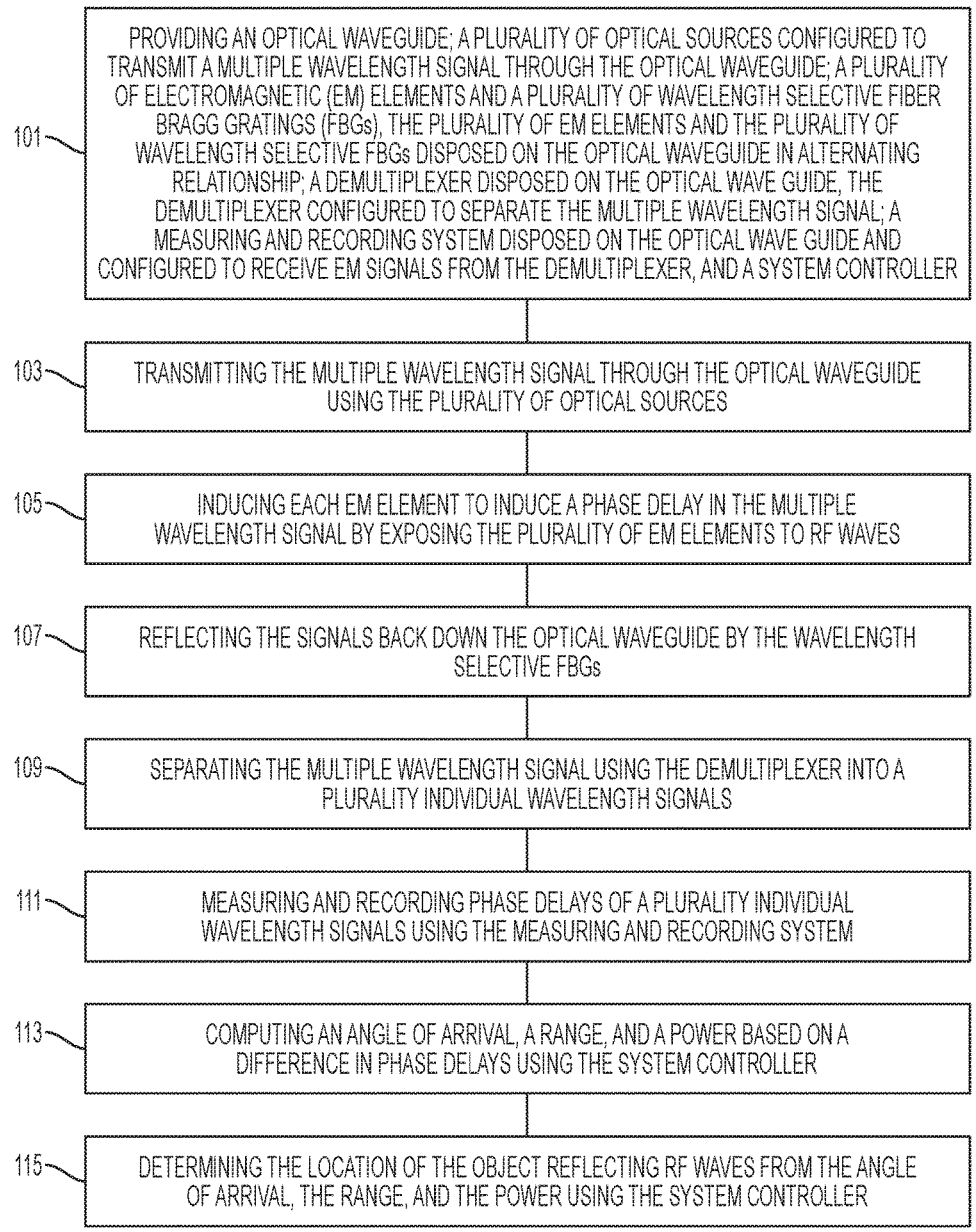
FIG. 9 shows a block diagram of an exemplary method for determining location of an object reflecting RF waves.

FIG. 9 shows an exemplary block diagram for a method of using the photonic hybrid receive antenna, see, e.g. FIG. 3. At 101, first, providing an optical waveguide, a plurality of optical sources configured to transmit a multiple wavelength signal through the optical wave guide, a plurality of EM elements and a plurality of wavelength selective FBGs, the plurality of EM elements and the plurality of wavelength selective FBGs that are disposed on the optical waveguide in an alternating relationship, a demultiplexer that is disposed on the optical waveguide where the demultiplexer is configured to receive an EM signal reflected from the plurality of wavelength selective FBGs, a measuring and recording system that is disposed on the optical wave guide and configured to receive EM signals from the demultiplexer, and a system controller that is in communication with the measuring and recording system; At 103, transmitting the multiple wavelength signal through the optical waveguide using the plurality of optical sources; next, 105, inducing each EM element to induce a phase delay in the multiple wavelength signal by exposing the plurality of EM elements to RF waves; next, 107, reflecting the signals back down the optical waveguide by the wavelength selective FBGs; next, 109, separating the multiple wavelength signal using the demultiplexer to individual wavelength signals, which then travel through a plurality of optical wave guides (each optical waveguide in the plurality of optical waveguides having one wavelength of the EM signal) to the measuring and recording system; next, 111, measuring and recording phase delays of the reflected individual signals using the measuring and recording system; next, 113, computing an angle of arrival, a range, and a power based on a difference in the phase delays using the system controller; and finally, 115, determining the location and/or RCS of an object reflecting RF waves from the angle of arrival, the range, and the power using the system controller.

Although the invention has been described in detail with reference to certain preferred embodiments, variations and modifications exist within the spirit and scope of the invention as described and defined in the following claims.

The invention claimed is:

1. An improved electromagnetic system for determining the location of an object reflecting radio frequency (RF) waves comprising:
   an optical waveguide;
   a plurality of optical sources, the plurality of optical sources configured to transmit a multiple wavelength signal through the optical wave guide;
   a plurality of wavelength selective fiber bragg gratings (FBGs) and a plurality of electromagnetic (EM) elements, each of the EM elements comprised of a metal plate and a ground plane, and further comprising a substrate having a first and second side, the first side disposed adjacent to the metal plate and the second side disposed adjacent to the ground plane, wherein each of the EM elements is configured to induce a voltage across the substrate from the metal plate to the ground plane when the metal plate is exposed to RF waves, and wherein the plurality of wavelength selective FBGs and the plurality of EM elements are disposed on the optical waveguide in alternating relationship, wherein the optical waveguide passes through the substrate such that when the multiple wavelength signal is emitted from the plurality of optical sources and is transmitted through the optical waveguide, its phase is delayed by the voltage within the EM elements and is reflected back down the optical waveguide by the plurality of wavelength selective FBGs, wherein the plurality of EM elements induces another phase delay;
   a demultiplexer, the demultiplexer configured to separate the multiple wavelength signal into a plurality of individual wavelengths that transmit through a plurality of optical waveguides, and wherein the demultiplexer is disposed on the optical wave guide such that it receives the multiple wavelength signal after reflection by the FBGs;
   a measuring and recording system disposed on the plurality of optical waveguides such that it receives the plurality of individual wavelengths and is configured to measure and record phase delays of the plurality of individual wavelengths; and
   a system controller in communication with the measuring and recording system and configured to compute an angle of arrival, a range, and a power based on differences in the phase delays of the plurality of individual wavelengths, and configured to determine the location of the object reflecting RF waves from the angle of arrival, the range, and the power; and
   an output system in communication with the system controller, the output system configured to communicate the location of the object reflecting RF waves to a user.

2. An improved electromagnetic system as in claim 1, wherein the plurality of optical sources comprises a plurality of lasers.

3. An improved electromagnetic system as in claim 1, wherein the optical waveguide is disposed in a serpentine pattern within the substrate of the EM element.

4. An improved electromagnetic system as in claim 1, wherein the optical waveguide is a fiber-optic line.

5. An improved electromagnetic system as in claim 1, wherein the metal plate is comprised of copper.

6. An improved electromagnetic system as in claim 1, wherein the output system is a radar display.

7. An improved electromagnetic system for determining the location of an object reflecting radio frequency (RF) waves comprising:
   an optical waveguide;
   at least one optical source, the optical source configured to transmit an electromagnetic (EM) signal through the optical waveguide;
   a splitter disposed along the optical waveguide, the splitter configured to split the EM signal such that the EM signal can travel both through a plurality of optical waveguides and through a reference optical waveguide;
   a plurality of EM elements disposed on an antenna support structure, each of the EM elements comprised of a metal plate and a ground plane, and further comprising a substrate disposed between the metal plate and the ground plane, wherein each optical waveguide in the plurality of optical waveguides travels through the substrate of at least one of the EM elements, and wherein each of the EM elements is configured to induce a voltage across the substrate from the metal plate to the ground plane when the metal plate is exposed to RF waves;

a plurality of wavelength selective fiber bragg gratings (FBGs), the plurality of wavelength selective FBGs and the plurality of EM elements disposed on the plurality of optical waveguides in alternating fashion, wherein each of the optical waveguides within the plurality of optical waveguides passes through the substrate of at least one of the EM elements, and wherein the EM signal is delayed by the voltage within the EM elements, and wherein the EM signal is reflected back down the plurality of optical waveguides by the plurality of wavelength selective FBGs, and wherein the EM elements induce a subsequent phase delay;

a measuring and recording system disposed on the plurality of optical waveguides and in communication with the reference optical waveguide such that it receives the EM signal after reflection by the wavelength FBGs and is configured to measure and record phase delays of the EM signal compared to the reference optical waveguide; and a system controller in communication with the measuring and recording system and configured to compute an angle of arrival, a range, and a power based on differences in the phase delay, and configured to determine the location of the object reflecting RF waves from the angle of arrival, the range, and the power.

8. The system as in claim 7, further comprising a demultiplexer, the demultiplexer configured to separate a multiple wavelength EM signal into a plurality of individual wavelength signals, and wherein the demultiplexer is disposed on the optical waveguide such that it receives the multiple wavelength EM signal after reflection by the FBGs.

9. The system as in claim 7, further comprising one or more amplifiers disposed along the plurality of optical waveguides and configured to increase the EM signal strength.

10. An improved electromagnetic system for determining the location of an object reflecting radio frequency (RF) waves, the system comprising:
an optical waveguide;
an optical source configured to emit an electromagnetic (EM) signal through the optical waveguide;
a splitter disposed along the optical waveguide, the splitter configured to split the EM signal such that the EM signal can travel both through a plurality of optical waveguides and through a reference optical waveguide;
an antenna support structure consisting of a plurality of EM elements, each of the EM elements comprised of a metal plate and a ground plane, and further comprising a substrate disposed between the metal plate and the ground plane, wherein each of the EM elements is configured to induce a voltage across the substrate from the metal plate to the ground plane when the metal plate is exposed to RF waves, wherein the plurality of optical waveguides is configured such that each optical waveguide is disposed within the substrate of at least one of the EM elements, and wherein the EM signal is delayed by the voltage as it passes the EM elements;
a measuring and recording system in communication with the plurality of optical waveguides and the reference optical waveguide and configured to determine a difference in phase delay between the EM signal transmitted along the plurality of optical waveguides and the EM signal transmitted along the reference optical waveguide which did not undergo phase delay; and
a system controller in communication with the measuring and recording system, and configured to calculate an angle of arrival, a range, and a power based on a difference in phase delay between the EM signal traveling along the plurality of optical waveguides and the EM signal traveling along the reference optical waveguide, and configured to determine the location of the object reflecting RF waves from the angle of arrival, the range, and the power.

11. The system as in claim 10, further comprising at least one amplifier disposed along the optical waveguide and configured to increase the EM signal strength.

12. The system as in claim 10, where the measuring and recording system is an optical timer, the optical timer configured to determine the time of phase delay between EM signals.

13. The system as in claim 10, where the measuring and recording system is an optical interferometer, the optical interferometer configured to determine the time of phase delay between EM signals.

14. The system as in claim 10, wherein the EM signal is an optical pulse.

15. The system as in claim 10, wherein the metal plate is comprised of copper.

16. The system as in claim 10, further comprising an electro-optic modulator (EOM), the EOM disposed along the optical waveguide and configured to control the modulation, such as pulse, width, and repetition period of the EM signal.

17. A method for determining the location of an object reflecting radiofrequency (RF) waves, the method comprising:
providing an optical waveguide; a plurality of optical sources configured to transmit a multiple wavelength signal through the optical waveguide; a plurality of electromagnetic (EM) elements and a plurality of wavelength selective fiber bragg gratings (FBGs), the plurality of EM elements and the plurality of wavelength selective FBGs disposed on the optical waveguide in alternating relationship;
a demultiplexer disposed on the optical wave guide, the demultiplexer configured to separate the multiple wavelength signal; a measuring and recording system disposed on the optical wave guide and configured to receive EM signals from the demultiplexer; and a system controller in communication with the measuring and recording system;
transmitting the multiple wavelength signal through the optical waveguide using the plurality of optical sources;
inducing each EM element to induce a phase delay in the multiple wavelength signal by exposing the plurality of EM elements to RF waves;
reflecting the signals back down the optical waveguide by the wavelength selective FBGs;
separating the multiple wavelength signal using the demultiplexer into a plurality individual wavelength signals;
measuring and recording phase delays of the a plurality individual wavelength signals using the measuring and recording system;

computing an angle of arrival, a range, and a power based on a difference in phase delays using the system controller; and determining the location of the object reflecting RF waves from the angle of arrival, the range, and the power using the system controller.

18. A method for determining location of an object reflecting radiofrequency (RF) waves, the method comprising:
- a means for emitting an electromagnetic (EM) signal;
- a means for transmitting the EM signal through a transition medium;
- a means for delaying phase of the EM signal proportional to intercepted RF waves;
- a means for measuring and recording phase delay of the EM signal;
- a means for computing an angle of arrival, a range, and a power of intercepted RF waves; and
- a means for computing location of the object reflecting RF waves from the angle of arrival, the range, and the power.

19. The method of claim 18, wherein the transition medium is an optical waveguide.

* * * * *